(12) United States Patent
Park et al.

(10) Patent No.: US 8,254,084 B2
(45) Date of Patent: *Aug. 28, 2012

(54) CHIP TYPE ELECTRIC DOUBLE LAYER CAPACITOR AND METHOD FOR MANUFACTURING THE SAME

(75) Inventors: Dong Sup Park, Suwon-si (KR); Ill Kyoo Park, Seoul (KR); Chang Ryul Jung, Seoul (KR); Sang Kyun Lee, Suwon-si (KR); Yeong Su Cho, Guri-si (KR); Sung Ho Lee, Seongnam-si (KR)

(73) Assignee: Samsung Electro-Mechanics Co., Ltd., Suwon (KR)

( * ) Notice: Subject to any disclaimer, the term of this patent is extended or adjusted under 35 U.S.C. 154(b) by 194 days.

This patent is subject to a terminal disclaimer.

(21) Appl. No.: 12/654,448

(22) Filed: Dec. 18, 2009

(65) Prior Publication Data

US 2011/0085283 A1    Apr. 14, 2011

(30) Foreign Application Priority Data

Oct. 13, 2009   (KR) .................. 10-2009-0097272

(51) Int. Cl.
*H01G 9/00*   (2006.01)
(52) U.S. Cl. ........ 361/502; 361/503; 361/504; 361/512; 361/523; 361/528
(58) Field of Classification Search .................. 361/502, 361/503–504, 509–512, 516–519, 523–525, 361/528–529, 540–541
See application file for complete search history.

(56) References Cited

U.S. PATENT DOCUMENTS

| 7,321,486 | B2 * | 1/2008 | Nemoto et al. | 361/305 |
| 7,541,111 | B2 * | 6/2009 | Itoh et al. | 429/175 |
| 8,081,418 | B2 * | 12/2011 | Brandon et al. | 361/523 |
| 2011/0128673 | A1 * | 6/2011 | Lee et al. | 361/502 |

FOREIGN PATENT DOCUMENTS

| JP | 1-315122 | 12/1989 |
| JP | 5-109589 | 4/1993 |
| JP | 11-54387 | 2/1999 |
| JP | 2000-286153 | 10/2000 |
| JP | 2001-216952 | 8/2001 |
| JP | 2005-183373 | 7/2005 |
| JP | 2005-353709 | 12/2005 |
| JP | 2006-49289 | 2/2006 |

(Continued)

OTHER PUBLICATIONS

Korean Office Action issued Mar. 4, 2011 in corresponding Korean Patent Application 10-2009-0097272.
Korean Notice of Allowance issued Aug. 19, 2011 in corresponding Korean Patent Application 10-2009-0097272.
Japanese Office Action dated Oct. 11, 2011 issued in corresponding Japanese Patent Application No. 2009-289209.

(Continued)

*Primary Examiner* — Nguyen T Ha

(57) ABSTRACT

The present invention provides a chip type electric double layer capacitor including: a lower case having an internal space of which an upper surface is opened and an external terminal of which portions exposed to a bottom of the internal space and the outside are connected to each other; an electric double layer capacitor cell disposed in the internal space of the lower case to be electrically connected to the portion of the external terminal, which is exposed to the bottom of the internal space; and an upper cap mounted on the lower case to cover the internal space, and a method for manufacturing the same.

20 Claims, 4 Drawing Sheets

FOREIGN PATENT DOCUMENTS

| | | |
|---|---|---|
| JP | 2007-207920 | 8/2007 |
| JP | 2008-85084 | 4/2008 |
| JP | 2008-186945 | 8/2008 |
| JP | 2008-211094 | 9/2008 |

OTHER PUBLICATIONS

Japanese Office Action dated Feb. 21, 2011 issued in corresponding Japanese Patent Application No. 2009-289209.

* cited by examiner

[FIG. 1]
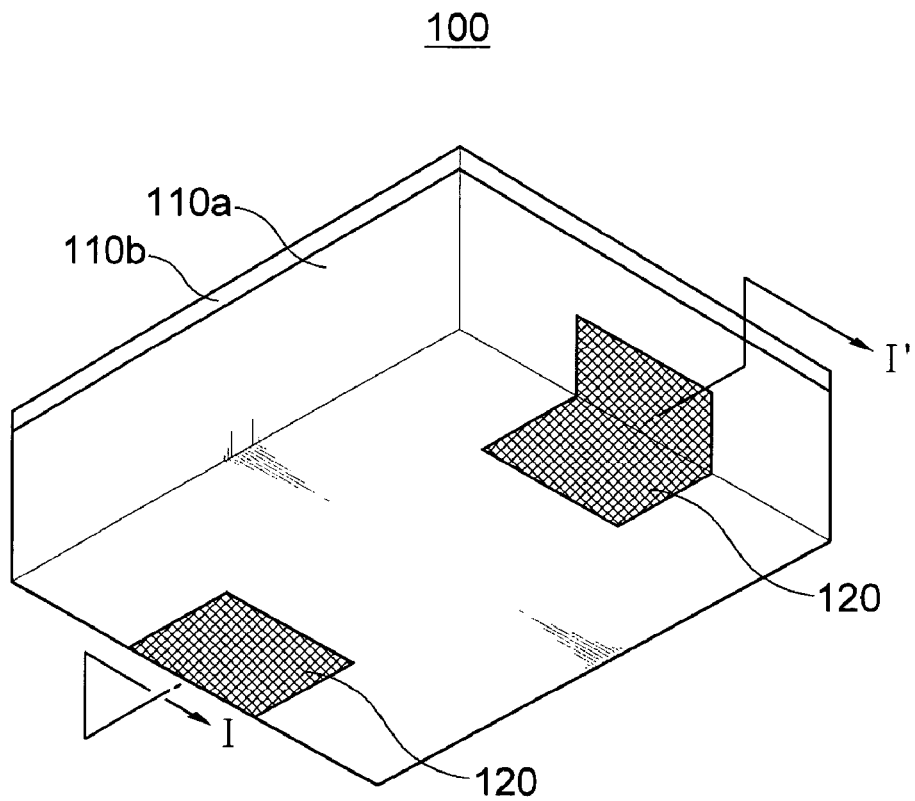
[FIG. 2]
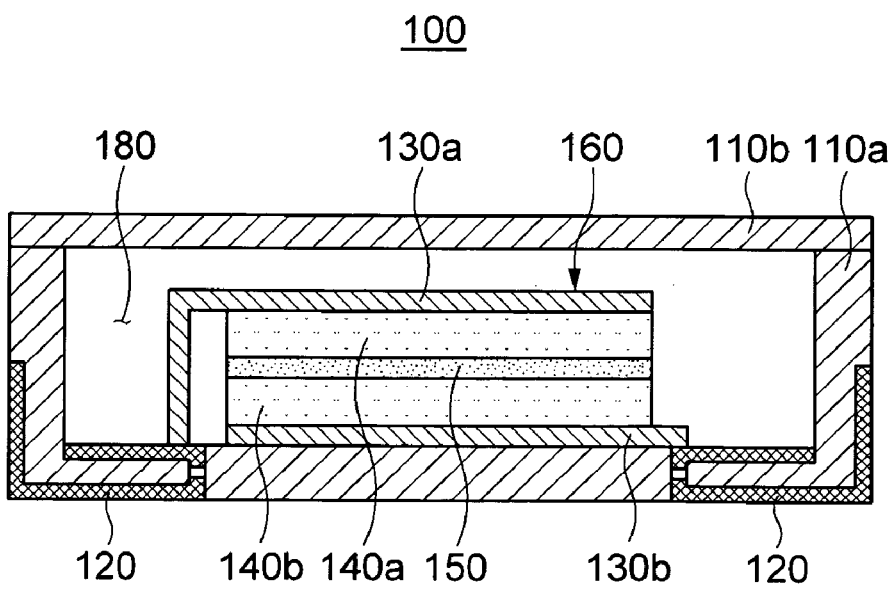

[FIG. 3]
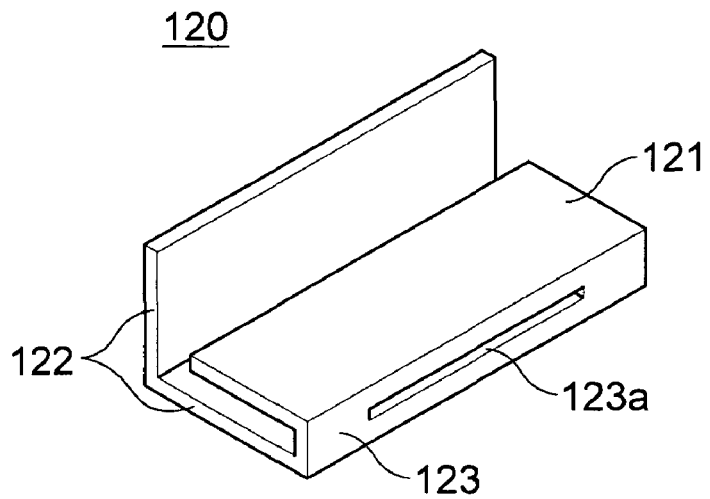
[FIG. 4]
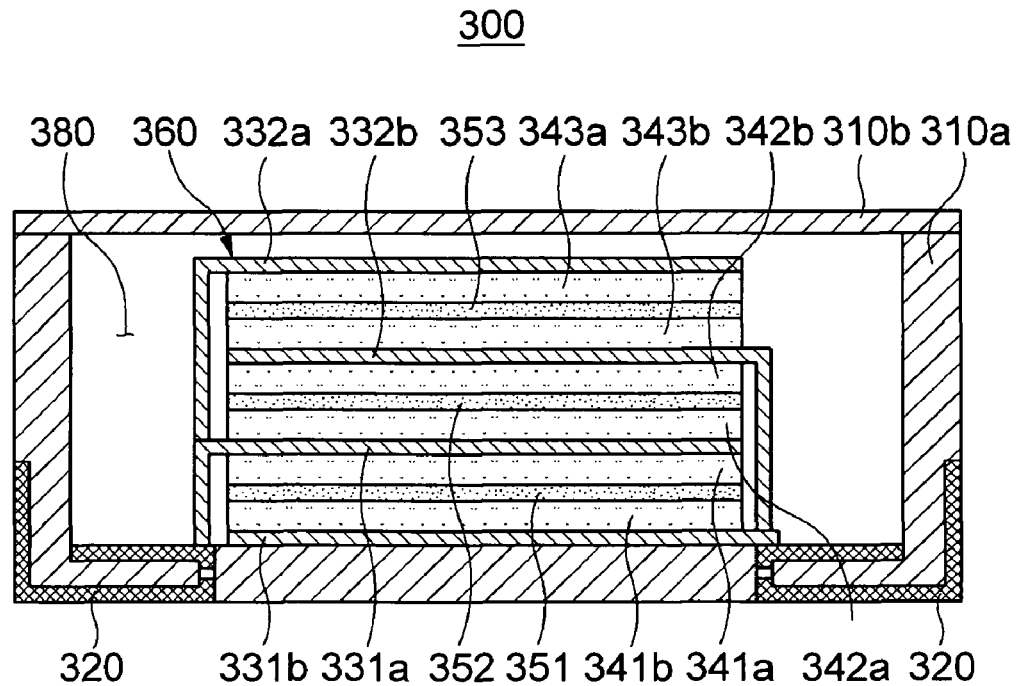

[FIG. 5]
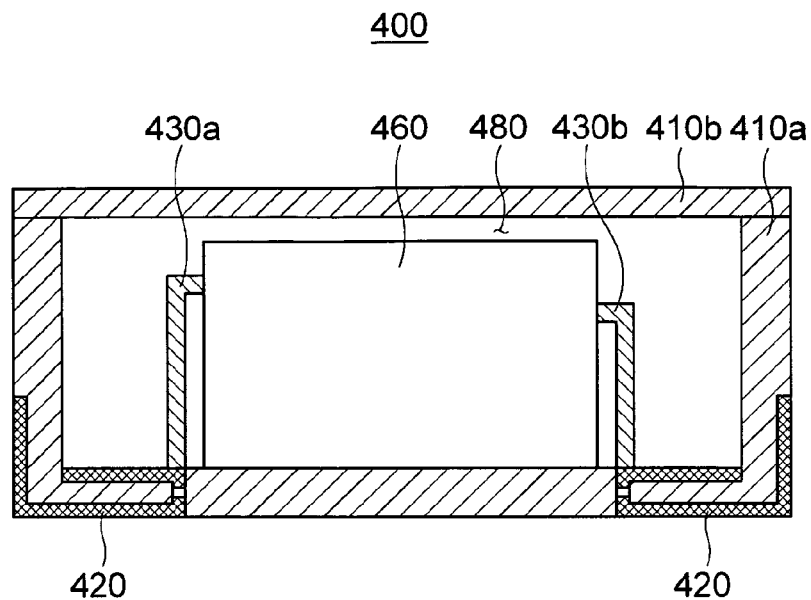
[FIG. 6]
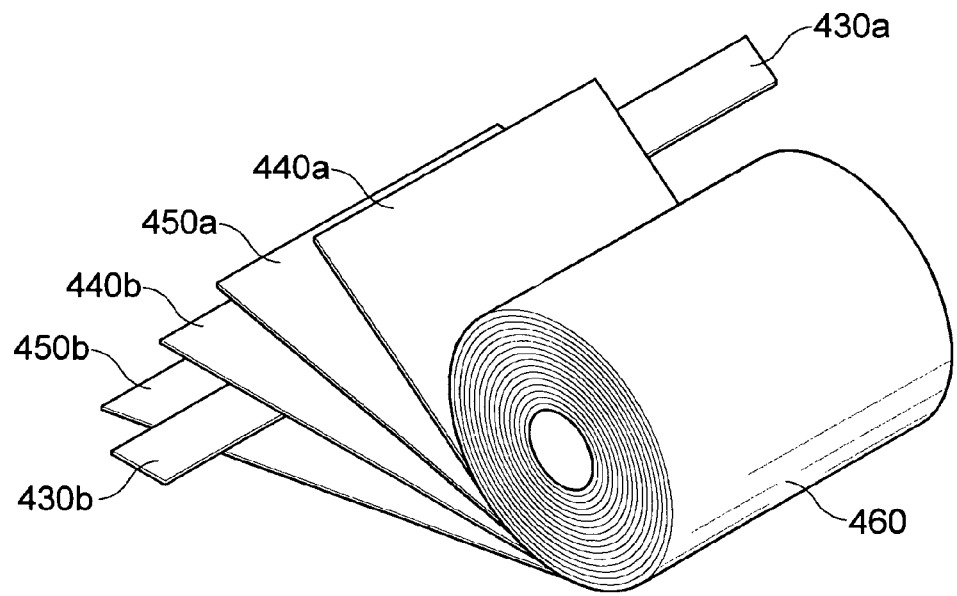

[FIG. 7]
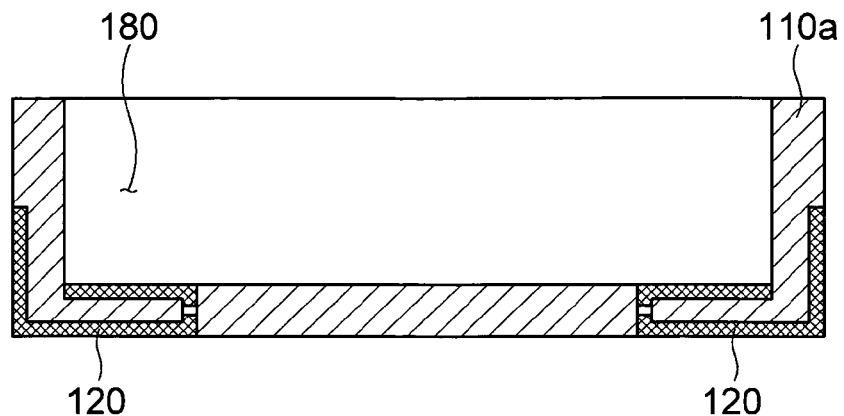
[FIG. 8]
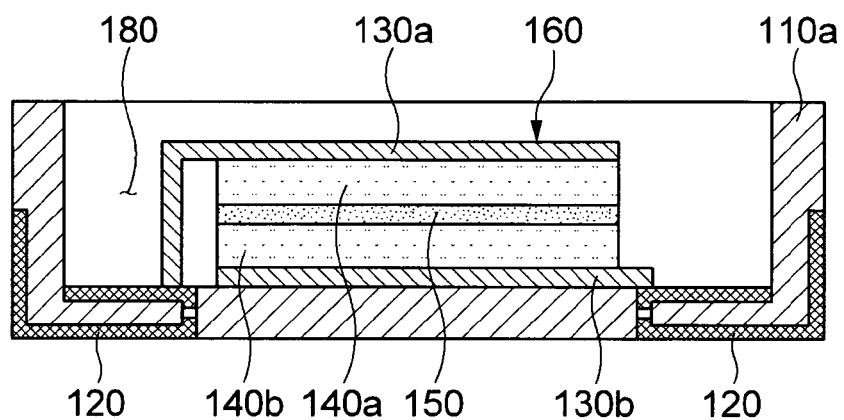
[FIG. 9]
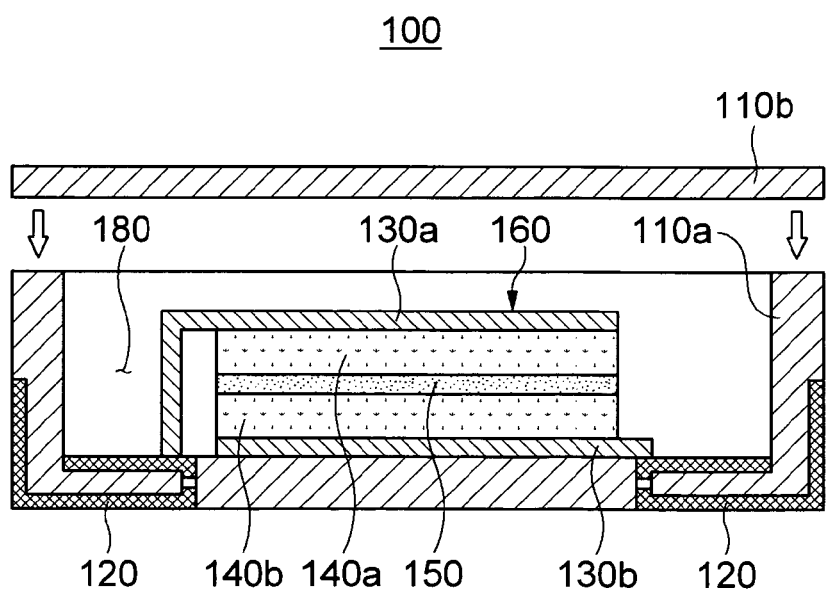

CHIP TYPE ELECTRIC DOUBLE LAYER CAPACITOR AND METHOD FOR MANUFACTURING THE SAME

CROSS-REFERENCE TO RELATED APPLICATIONS

This application claims the benefit of Korean Patent Application No. 10-2009-0097272 filed with the Korea Intellectual Property Office on Oct. 13, 2009, the disclosure of which is incorporated herein by reference.

BACKGROUND OF THE INVENTION

1. Field of the Invention

The present invention relates to a chip type electric double layer capacitor and a method for manufacturing the same, and more particularly, to a chip type electric double layer capacitor having an external terminal of which portions exposed to a bottom of an internal space and the outside of a lower case are integrally connected to each other, and a method for manufacturing the same.

2. Description of the Related Art

Stable energy supply is an important factor in various electronic products such as information and communication equipment. Generally, this function is performed by a capacitor. That is, the capacitor plays a role of collecting and discharging electricity and stabilizing an electricity flow in a circuit of the information and communication equipment and the various electronic products. The general capacitor has a short charging and discharging time, a long life, and a high output density, but it has a limitation to be used as a storage device due to a low energy density.

In order to overcome this limitation, recently, a new category of capacitors such as an electric double layer capacitor having a short charging and discharging time and a high output density has been developed and is in the spotlight with a secondary battery.

The electric double layer capacitor, as an energy storage device using a pair of charge layers (electrode layers) of different polarities, is capable of continuously charging and discharging and has advantages of energy efficiency, output, durability, and stability in comparison with other general capacitors. Accordingly, recently, the electric double layer capacitor, which is capable of high current charging and discharging, is promising as an electrical storage device having high charging and discharging frequency such as an auxiliary power supply for mobile phones, an auxiliary power supply for electric vehicles, and an auxiliary power supply for solar cells.

The electric double layer capacitor has a basic structure composed of an electrode with a relatively large surface area such as a porous electrode, electrolyte, a current collector, and a separator. The electric double layer capacitor employs an electrochemical mechanism generated when ions in the electrolyte move along an electric field and are absorbed on a surface of the electrode by applying several bolts of voltage to both ends of the unit cell electrode, as an operation principle.

A general method to surface-mount this electric double layer capacitor on a circuit board is to surface-mount the electric double layer capacitor on the circuit board through brackets by welding the brackets to upper and lower parts of the electric double layer capacitor.

However, a thickness of the electric double layer capacitor of this structure is relatively large and increased by additional structures (brackets and the like) required for surface-mounting. In case of using this electric double layer capacitor, there is a difficulty in manufacturing a high capacity product due to increase in thickness, and further, that is a product price rise factor due to additional processes.

SUMMARY OF THE INVENTION

The present invention has been proposed in order to solve the above-described problems, and it is, therefore, an object of the present invention to provide a chip type electric double layer capacitor capable of being surface-mounted without additional structures and preventing internal electrolyte from leaking to the outside by having an external terminal of which portions exposed to a bottom of an internal space and the outside of the lower case are integrally connected to each other, and a method for manufacturing the same.

In accordance with an aspect of the present invention to achieve the object, there is provided a chip type electric double layer capacitor including: a lower case having an internal space of which an upper surface is opened and an external terminal of which portions exposed to a bottom of the internal space and the outside are connected to each other; an electric double layer capacitor cell disposed in the internal space of the lower case to be electrically connected to the portion of the external terminal, which is exposed to the bottom of the internal space; and an upper cap mounted on the lower case to cover the internal space.

Here, the external terminal includes a first terminal portion having one surface exposed to an edge of the bottom of the internal space of the lower case; a second terminal portion bent along an external bottom and an external side surface of the lower case to expose one surface from an edge of the external bottom of the lower case to the external side surface connected thereto; and a third terminal portion connected to one end of the first terminal portion by vertically upwardly extending through the lower case from an end of the second terminal portion exposed to the external bottom of the lower case.

Further, the first, second, and third terminal portions may be integrally connected to one another.

Further, the other surface opposite to the exposed one surface of each of the first and second terminal portions may be covered with the lower case.

Further, the external terminal may further include a through groove formed in a portion of the third terminal portion and filled with an insulating resin.

Further, the lower case may be formed by integrally molding the external terminal and the insulating resin.

Further, the lower case and the upper cap may be combined by welding or ultrasonic welding.

Further, the electric double layer capacitor cell includes first and second current collectors; first and second electrodes respectively connected to the first and second current collectors; and an ion permeable separator formed between the first and second electrodes.

Further, the external terminal and the electric double layer capacitor cell may be connected by welding or ultrasonic welding.

Further, the electric double layer capacitor cell may be formed by successively stacking one or more of first and second current collectors, first and second electrodes, and separators.

Further, the electric double layer capacitor cell may be formed by winding first and second electrodes.

In accordance with another aspect of the present invention to achieve the object, there is provided a method for manufacturing a chip type electric double layer capacitor including the steps of: forming a lower case having an internal space of which an upper surface is opened by integrally molding an external terminal and an insulating resin, wherein portions of the external terminal, which are exposed to a bottom of the internal space and the outside of the lower case, are connected to each other; mounting an electric double layer capacitor cell in the internal space to be electrically connected to the portion of the external terminal, which is exposed to the bottom of the internal space of the lower case; and mounting an upper cap on the lower case to cover the internal space.

Here, in the step of forming the lower case, the external terminal includes a first terminal portion having one surface exposed to an edge of the bottom of the internal space of the lower case, a second terminal portion bent along an external bottom and an external side surface of the lower case to expose one surface from an edge of the external bottom of the lower case to the external side surface connected thereto, and a third terminal portion connected to one end of the first terminal portion by vertically upwardly extending through the lower case from an end of the second terminal portion exposed to the external bottom of the lower case.

Further, the first, second, and third terminal portions may be integrally connected to one another.

Further, the other surface opposite to the exposed one surface of each of the first and second terminal portions may be covered with the lower case.

Further, a through groove may be formed in a portion of the third terminal portion and filled with the insulating resin.

Further, the lower case may be formed by insert injection molding.

Further, in the step of mounting the electric double layer capacitor cell, the external terminal and the electric double layer capacitor cell may be connected by welding or ultrasonic welding.

Further, after the step of mounting the electric double layer capacitor cell, the method may further include the step of filling electrolyte in the internal space of the lower case.

Further, in the step of mounting the upper cap on the lower case, the lower case and the upper cap are combined by welding or ultrasonic welding.

BRIEF DESCRIPTION OF THE DRAWINGS

These and/or other aspects and advantages of the present general inventive concept will become apparent and more readily appreciated from the following description of the embodiments, taken in conjunction with the accompanying drawings of which:

FIG. 1 is a rough perspective view showing a chip type electric double layer capacitor in accordance with one embodiment of the present invention;

FIG. 2 is a rough cross-sectional view showing the chip type electric double layer capacitor taken along a line of I-I' of FIG. 1;

FIG. 3 is a rough perspective view showing an external terminal of the chip type electric double layer capacitor shown in FIG. 2;

FIG. 4 is a rough cross-sectional view showing a chip type electric double layer capacitor in accordance with another embodiment of the present invention;

FIG. 5 is a rough cross-sectional view showing a chip type electric double layer capacitor in accordance with still another embodiment of the present invention;

FIG. 6 is a rough perspective view showing an electric double layer capacitor cell of the chip type electric double layer capacitor shown in FIG. 5; and FIGS. 7 to 9 are cross-sectional views for explaining a method for manufacturing a chip type electric double layer capacitor in accordance with one embodiment of the present invention.

DETAILED DESCRIPTION OF THE PREFERRED EMBODIMENTS

Hereinafter, preferred embodiments of the present invention will be explained with reference to the accompanying drawings.

However, the embodiments of the present invention can be modified into various other forms, and the scope of the present invention is not limited to the following embodiments. Further, the embodiments of the present invention are provided to more completely explain the present invention to a person with average knowledge in the art. Therefore, in the drawings, shapes and sizes of elements may be exaggerated for clarity, and like reference numerals refer to like elements throughout.

FIG. 1 is a rough perspective view showing a chip type electric double layer capacitor in accordance with one embodiment of the present invention. FIG. 2 is a rough cross-sectional view showing the chip type electric double layer capacitor taken along a line of I-I' of FIG. 1. FIG. 3 is a rough perspective view showing an external terminal of the chip type electric double layer capacitor shown in FIG. 2.

Referring to FIGS. 1 to 3, the chip type electric double layer capacitor 100 in accordance with one embodiment of the present invention includes a lower case 110a having an internal space 180 of which an upper surface is opened and an external terminal 120 and made of an insulating resin, an electric double layer capacitor cell 160 disposed in the internal space 180 of the lower case 110a, and an upper cap 110b mounted on the lower case 110a to cover the internal space 180.

The lower case 110a may be formed by integrally molding the external terminal 120 and the insulating resin. At this time, the insulating resin may be polyphenylene sulfide (PPS) or liquid crystal polymer (LCP).

The upper cap 110b may be made of an insulating resin such as PPS or LCP, like the lower case 110a.

Accordingly, an internal structure of the chip type electric double layer capacitor 100 can be protected by the lower case 110a and the upper cap 110b in a surface mounting process performed in a high temperature (approximately 240~270° C.).

The lower case 110a and the upper cap 110b may be combined by welding or ultrasonic welding.

Especially, in the external terminal 120 provided in the lower case 110a of the chip type electric double layer capacitor 100 in accordance with the embodiment of the present invention, portions exposed to a bottom of the internal space 180 and the outside of the lower case 110a are connected to each other.

That is, the external terminal 120 includes a first terminal portion 121 having one surface exposed to an edge of the bottom of the internal space 180 of the lower case 110a; a second terminal portion 122 bent along an external bottom and an external side surface of the lower case 110a to expose one surface from an edge of the external bottom of the lower case 110a to the external side surface connected thereto; and a third terminal portion 123 connected to one end of the first terminal portion 121 by vertically upwardly extending through the lower case 110a from an end of the second terminal portion 122 exposed to the external bottom of the lower case 110a.

At this time, the first, second, and third terminal portions 121 to 123 are integrally connected to one another.

And, the other surfaces opposite to the one surfaces of the first and second terminal portions 121 and 122, which are respectively exposed to the bottom of the internal space 180 and the outside of the lower case 110a, are covered with the lower case 110a.

Further, a through groove 123a is formed in a portion of the third terminal portion 123.

The insulating resin is filled in the through groove 123a.

That is, when the external terminal 120 is integrally molded with the insulating resin of the lower case 110a, the insulating resin is also filled in the through groove 123a of the third terminal portion 123.

The chip type electric double layer capacitor 100 having the external terminal 120 composed of these first, second, and third terminal portions 121 to 123 can be surface-mounted without additional structures.

The electric double layer capacitor cell 160 is electrically connected to the portion of the external terminal 120, which is exposed to the bottom of the internal space 180, that is, the first terminal portion 121. At this time, the external terminal 120 and the electric double layer capacitor cell 160 may be connected by welding or ultrasonic welding.

Electrolyte is filled in the internal space 180 of the lower case 110b in which the electric double layer capacitor cell 160 is mounted. The electrolyte may be aqueous electrolyte or non-aqueous electrolyte.

The electric double layer capacitor cell 160 includes first and second current collectors 130a and 130b, first and second electrodes 140a and 140b respectively connected to the first and second collectors 130a and 130b, and an ion permeable separator 150 formed between the first and second electrodes 140a and 140b.

The first and second current collectors 130a and 130b, as conductive sheets for respectively transmitting electrical signals to the first and second electrodes 140a and 140b, may be made of conductive polymer or metallic foil. In this embodiment, the electric double layer capacitor cell 160 is electrically connected to the first terminal portion 121 of the external terminal 120 by the first and second current collectors 130a and 130b. Shapes of the first and second current collectors 130a and 130b may be properly changed so that the first and second current collectors 130a and 130b are electrically connected to the first terminal portion 121. This shape change may be affected by a shape or a size of the electric double layer capacitor cell 160.

As shown in FIG. 2, the first current collector 130a may have a partially bent shape to be connected to the first terminal portion 121. The first and second current collectors 130a and 130b may be directly connected to the first terminal portion 121.

Although it is not shown, the first and second current collectors 130a and 130b may be electrically connected to the first terminal portion 121 through proper connection means.

In case that the electric double layer capacitor cell 160 does not include the first and second current collectors 130a and 130b, the first and second electrodes 140a and 140b may be electrically connected to the first terminal portion 121 exposed to the internal space 180.

The first and second electrodes 140a and 140b may be made of polarizable electrode material or activated carbon having a relatively large specific surface area. The first and second electrodes 140a and 140b are manufactured by forming electrode material, which uses powder activated carbon as main material, into solid sheets or adhering electrode material slurry onto the first and second current collectors 130a and 130b.

The separator 150 may be made of porous material to be capable of permeating ions. Although it is not limited this, for example, the porous material may be polypropylene, polyethylene, or glass fiber.

As described above, the chip type electric double layer capacitor 100 in accordance with one embodiment of the present invention is capable of being surface-mounted without additional structures by having the external terminal 120 which includes the first terminal portion 121 having one surface exposed to the bottom of the internal space 180 of the lower case 110a, the second terminal portion 122 bent along an external bottom and an external side surface of the lower case 110a to expose one surface to the external bottom and the external side surface of the lower case 110a, and the third terminal portion 123 integrally connected to the first and second terminal portions 121 and 122 and passing through the lower case 110a.

That is, it is possible to simplify a surface mounting process by applying a collective mount technology using a soldering method.

Further, in accordance with one embodiment of the present invention, as described above, since the external terminal 120, which includes the first terminal portion 121 having one surface exposed to the bottom of the internal surface 180 of the lower case 110a, the second terminal portion 122 bent to expose one surface to the external bottom and the external side surface of the lower case 110a, and the third terminal portion 123 integrally connected to the first and second terminal portions 121 and 122 and passing through the lower case 110a, is integrally provided in the lower case 110a, it is possible to prevent the electrolyte in the chip type electric double layer capacitor 100 from leaking to the outside, thereby improving life and reliability of products.

FIG. 4 is a rough cross-sectional view showing a chip type electric double layer capacitor 300 in accordance with another embodiment of the present invention. Hereinafter, elements different from the above-described embodiment will be mainly described, and thus detailed descriptions of the same elements will be omitted.

Referring to FIG. 4, an electric double layer capacitor cell 360 has a multilayer structure in which one or more of first and second current collectors, first and second electrodes, and separators are continuously stacked.

More specifically, a first-first current collector 331a and a first-second current collector 331b are connected to an external terminal 320, respectively. In order to form one unit cell, a first-first electrode 341a is connected to the first-first current collector 331a, a first-second current collector 341b is connected to the first-second current collector 331b, and a first ion permeable separator 351 is formed between the first-first electrode 341a and the first-second electrode 341b.

Further, in order to form another unit cell, a second-first electrode 342a is connected to the first-first current collector 331a, a second-second electrode 342b is connected to a second-second current collector 332b, and a second ion permeable separator 352 is formed between the second-first electrode 342a and the second-second electrode 342b. The second-second current collector 332b is bent to be electrically connected to the first-second current collector 331b.

Further, in order to form still another unit cell, a third-second electrode 343b is connected to the second-second current collector 332b, a third-first electrode 343a is connected to a second-first current collector 332a, and a third ion permeable separator 353 is formed between the third-first electrode 343a and the third-second electrode 343b. The second-first current collector 332a is bent to be electrically connected to the first-first current collector 331a.

Like this embodiment, it is possible to obtain higher electric capacity by stacking a plurality of unit cells. Further, although it is not shown, it is possible to prevent an unintended short-circuit by coating insulating material on the outside of a unit cell stack.

FIG. 5 is a rough cross-sectional view showing a chip type electric double layer capacitor 400 in accordance with still another embodiment of the present invention. FIG. 6 is a rough perspective view showing an electric double layer capacitor cell 460 of the chip type electric double layer capacitor shown in FIG. 5. Hereinafter, elements different from the above-described embodiment will be mainly described, and thus detailed descriptions of the same elements will be omitted.

Referring to FIGS. 5 and 6, the electric double layer capacitor cell 460 of the chip type electric double layer capacitor 400 in accordance with this embodiment is formed by winding first and second electrodes.

More specifically, the electric double layer capacitor cell 460 is formed by sequentially stacking a first electrode 440a, a first separator 450a, a second electrode 440b, and a second separator 450b and winding a resultant stack. A first current collector 430a and a second current collector 430b are connected to the first electrode 440a and the second electrode 440b, respectively.

The electric double layer capacitor cell 460 is disposed in an internal space 480 of a lower case 410b. The first current collector 430a and the second current collector 430b are bent to be electrically connected to an external terminal 420, respectively.

FIGS. 7 to 9 are cross-sectional views for explaining a method for manufacturing a chip type electric double layer capacitor in accordance with one embodiment of the present invention.

First, as shown in FIG. 7, a lower case 110a is formed by integrally molding an external terminal 120 and an insulating resin and has an internal space 180 of which an upper surface is opened. At this time, the lower case 110a is formed so that portions of the external terminal 120, which are exposed to a bottom of the internal space 180 and the outside of the lower case 110a, are connected to each other.

The lower case 110a may be formed by a method of integrally molding the insulating resin and the external terminal 120, for example, insert injection molding.

More specifically, the external terminal 120 is disposed in a mold having a desired shape of the lower case 110a, and the insulating resin is filled in the mold. The insulating resin filled in the mold is solidified with the external terminal 120 in the mold by cooling or crosslinking. The insulating resin and the external terminal 120 of different materials are integrated by insert injection molding.

Here, the external terminal 120, as shown in FIG. 3, includes a first terminal portion 121 having one surface exposed to an edge of the bottom of the internal space 180 of the lower case 110a, a second terminal portion 122 bent along an external bottom and an external side surface of the lower case 110a to expose one surface from an edge of the external bottom of the lower case 110a to the external side surface connected thereto, and a third terminal portion 123 connected to one end of the first terminal portion 121 by vertically upwardly extending through the lower case 110a from an end of the second terminal portion 122 exposed to the external bottom of the lower case 110a.

Here, the first, second, and third terminal portions 121 to 123 are integrally connected to one another.

And, the other surface opposite to the exposed one surface of each of the first and second terminal portions 121 and 122 is covered with the lower case 110a.

A through groove 123a is formed in a portion of the third terminal portion 123 and filled with the insulating resin.

That is, when the external terminal 120 is integrally molded with the insulating resin of the lower case 110a, the insulating resin is also filled in the through groove 123a of the third terminal portion 123.

Next, as shown in FIG. 8, an electric double layer capacitor cell 160 is mounted in the internal space 180 to be electrically connected to the portion of the external terminal 120, which is exposed to the bottom of the internal space 180 of the lower case 110a.

As described above, the electric double layer capacitor cell 160 includes first and second current collectors 130a and 130b, first and second electrodes 140a and 140b respectively connected to the first and second collectors 130a and 130b, and an ion permeable separator 150 formed between the first and second electrodes 140a and 140b. The first and second current collectors 130a and 130b are electrically connected to the one surface of the first terminal portion 121, which is exposed to the internal space 180 of the external terminal 120. The first current collector 130a may have a bent shape.

The external terminal 120 and the first and second collectors 130a and 130b of the electric double layer capacitor cell 160 may be connected by welding or ultrasonic welding. Although it is not limited to this, the welding may be resistance welding or arc welding.

Like this, after mounting the electric double layer capacitor cell 160 on the lower case 110a, electrolyte is filled in the internal space 180 of the lower case 110a. The electrolyte may be aqueous electrolyte or non-aqueous electrolyte.

Next, as shown in FIG. 9, an upper cap 110b is mounted on the lower case 110a to cover the internal space 180.

The lower case 110a and the upper cab 110b may be combined by welding or ultrasonic welding. Although it is not limited to this, the welding may be resistance welding or arc welding. By this method, it is possible to protect the electric double layer capacitor cell 160 by improving sealing performance between the lower case 110a and the upper cap 110b.

Especially, in accordance with one embodiment of the present invention, as described above, since the external terminal 120 of which the first, second, and third terminal portions 121 to 123 are integrally connected to one another is integrally molded with the lower case 110a, it is possible to prevent the electrolyte filled in the internal space 180 of the lower case 110a from leaking to the outside. Therefore, it is possible to improve the life and reliability of the products.

As described above, the chip type electric double layer capacitor in accordance with the present invention is capable of being surface-mounted without additional structures by having the external terminal including the first terminal portion having one surface exposed to the bottom of the internal space of the lower case, the second terminal portion bent to expose one surface to the external bottom and the external side surface of the lower case, and the third terminal portion integrally connected to the first and second terminal portions and passing through the lower case.

And, the present invention simplifies a surface mounting process by applying a collective mount technology using a soldering method.

Further, the present invention prevents the electrolyte in the chip type electric double layer capacitor from leaking to the outside by having the external terminal including the first, second, and third terminal portions, thereby improving the life and reliability of the products.

It should be noted that the present invention is not limited by the above-described embodiments and the accompanying drawings but limited by the appended claims. Therefore, it will be appreciated by those skilled in the art that substitutions, modifications and variations may be made in these embodiments without departing from the principles and spirit of the general inventive concept, the scope of which is defined in the appended claims and their equivalents.

What is claimed is:

1. A chip type electric double layer capacitor comprising:
   a lower case having an internal space of which an upper surface is opened and an external terminal of which portions exposed to a bottom of the internal space and the outside are connected to each other;
   an electric double layer capacitor cell disposed in the internal space of the lower case to be electrically connected to the portion of the external terminal, which is exposed to the bottom of the internal space; and
   an upper cap mounted on the lower case to cover the internal space.

2. The chip type electric double layer capacitor according to claim 1, wherein the external terminal comprises:
   a first terminal portion having one surface exposed to an edge of the bottom of the internal space of the lower case;
   a second terminal portion bent along an external bottom and an external side surface of the lower case to expose one surface from an edge of the external bottom of the lower case to the external side surface connected thereto; and
   a third terminal portion connected to one end of the first terminal portion by vertically upwardly extending through the lower case from an end of the second terminal portion exposed to the external bottom of the lower case.

3. The chip type electric double layer capacitor according to claim 2, wherein the first, second, and third terminal portions are integrally connected to one another.

4. The chip type electric double layer capacitor according to claim 2, wherein the other surface opposite to the exposed one surface of each of the first and second terminal portions is covered with the lower case.

5. The chip type electric double layer capacitor according to claim 2, wherein the external terminal further comprises a through groove formed in a portion of the third terminal portion and filled with an insulating resin.

6. The chip type electric double layer capacitor according to claim 1, wherein the lower case is formed by integrally molding the external terminal and an insulating resin.

7. The chip type electric double layer capacitor according to claim 1, wherein the lower case and the upper cap are combined by welding or ultrasonic welding.

8. The chip type electric double layer capacitor according to claim 1, wherein the electric double layer capacitor cell comprises:
   first and second current collectors;
   first and second electrodes respectively connected to the first and second current collectors; and
   an ion permeable separator formed between the first and second electrodes.

9. The chip type electric double layer capacitor according to claim 1, wherein the external terminal and the electric double layer capacitor cell are connected by welding or ultrasonic welding.

10. The chip type electric double layer capacitor according to claim 1, wherein the electric double layer capacitor cell is formed by successively stacking one or more of first and second current collectors, first and second electrodes, and separators.

11. The chip type electric double layer capacitor according to claim 1, wherein the electric double layer capacitor cell is formed by winding first and second electrodes.

12. A method for manufacturing a chip type electric double layer capacitor comprising:
   forming a lower case having an internal space of which an upper surface is opened by integrally molding an external terminal and an insulating resin, wherein portions of the external terminal, which are exposed to a bottom of the internal space and the outside of the lower case, are connected to each other;
   mounting an electric double layer capacitor cell in the internal space to be electrically connected to the portion of the external terminal, which is exposed to the bottom of the internal space of the lower case; and
   mounting an upper cap on the lower case to cover the internal space.

13. The method according to claim 12, wherein in forming the lower case, the external terminal comprises a first terminal portion having one surface exposed to an edge of the bottom of the internal space of the lower case, a second terminal portion bent along an external bottom and an external side surface of the lower case to expose one from an edge of the external bottom of the lower case to the external side surface connected thereto, and a third terminal portion connected to one end of the first terminal portion by vertically upwardly extending through the lower case from an end of the second terminal portion exposed to the external bottom of the lower case.

14. The method according to claim 13, the first, second, and third terminal portions are integrally connected to one another.

15. The method according to claim 13, wherein the other surface opposite to the exposed one surface of each of the first and second terminal portions is covered with the lower case.

16. The method according to claim 13, wherein a through groove is formed in a portion of the third terminal portion and filled with the insulating resin.

17. The method according to claim 12, wherein the lower case is formed by insert injection molding.

18. The method according to claim 12, wherein in mounting the electric double layer capacitor cell, the external terminal and the electric double layer capacitor cell are connected by welding or ultrasonic welding.

19. The method according to claim 12, after mounting the electric double layer capacitor cell, further comprising the step of filling electrolyte in the internal space of the lower case.

20. The method according to claim 12, wherein in mounting the upper cap on the lower case, the lower case and the upper case are combined by welding or ultrasonic welding.

* * * * *

UNITED STATES PATENT AND TRADEMARK OFFICE
CERTIFICATE OF CORRECTION

PATENT NO.        : 8,254,084 B2                           Page 1 of 1
APPLICATION NO.   : 12/654448
DATED             : August 28, 2012
INVENTOR(S)       : Dong Sup Park et al.

It is certified that error appears in the above-identified patent and that said Letters Patent is hereby corrected as shown below:

Column 10, Lines 55-56, In Claim 19, after "comprising" delete "the step of".

Signed and Sealed this
Nineteenth Day of March, 2013

Teresa Stanek Rea
*Acting Director of the United States Patent and Trademark Office*